US008418171B2

(12) United States Patent
Volovic et al.

(10) Patent No.: US 8,418,171 B2
(45) Date of Patent: Apr. 9, 2013

(54) SOFTWARE OPTION SELECTION AND VALIDATION SYSTEM

(75) Inventors: Gregory S Volovic, Carmel, IN (US); Matthew David Trepina, Westfield, IN (US); Elias G Pavlakos, Westfield, IN (US)

(73) Assignee: Hurco Companies, Inc., Indianapolis, IN (US)

( * ) Notice: Subject to any disclaimer, the term of this patent is extended or adjusted under 35 U.S.C. 154(b) by 1021 days.

(21) Appl. No.: 12/103,680

(22) Filed: Apr. 15, 2008

(65) Prior Publication Data
US 2009/0260002 A1    Oct. 15, 2009

(51) Int. Cl.
G06F 9/445   (2006.01)
G06F 17/30   (2006.01)

(52) U.S. Cl. .......................................... 717/174; 726/26
(58) Field of Classification Search ............... 717/174, 717/168, 169, 170, 172, 173, 175, 176, 177, 717/178
See application file for complete search history.

(56) References Cited

U.S. PATENT DOCUMENTS

| | | | |
|---|---|---|---|
| 1,380,908 A | | 6/1921 | Hothersall |
| 5,212,645 A | | 5/1993 | Wildes et al. |
| 6,246,920 B1 | | 6/2001 | Mizuno et al. |
| 6,363,282 B1 | * | 3/2002 | Nichols et al. .................. 607/30 |
| 6,370,455 B1 | | 4/2002 | Larson et al. |
| 6,418,554 B1 | * | 7/2002 | Delo et al. ..................... 717/174 |
| 6,523,166 B1 | * | 2/2003 | Mishra et al. .................. 717/174 |
| 7,711,598 B2 | * | 5/2010 | Perkowski .................. 705/14.51 |
| 7,848,948 B2 | * | 12/2010 | Perkowski et al. .......... 705/14.4 |
| 2003/0014498 A1 | | 1/2003 | Kreidler et al. |
| 2003/0033041 A1 | | 2/2003 | Richey |
| 2003/0065418 A1 | | 4/2003 | Kwak |
| 2003/0208293 A1 | | 11/2003 | Mountcastle et al. |
| 2004/0167659 A1 | | 8/2004 | Scherer |
| 2004/0254836 A1 | * | 12/2004 | Emoke Barabas et al. ..... 705/14 |
| 2005/0010918 A1 | * | 1/2005 | Childs et al. .................. 717/174 |
| 2005/0071124 A1 | | 3/2005 | Komatsu |
| 2005/0091422 A1 | * | 4/2005 | Minogue et al. .................. 710/8 |
| 2005/0102664 A1 | * | 5/2005 | Eyres et al. .................... 717/174 |
| 2005/0143850 A1 | | 6/2005 | Pavlik et al. |

(Continued)

FOREIGN PATENT DOCUMENTS

| | | |
|---|---|---|
| EP | 1380908 | 1/2004 |
| EP | 1528454 | 5/2005 |
| WO | WO 98/53384 | 11/1998 |
| WO | WO 2007/123893 | 11/2007 |

OTHER PUBLICATIONS

International Preliminary Search Report on Patentability for PCT/US2009/039632 issued by the European Patent Office (12 pages).

(Continued)

Primary Examiner — Don Wong
Assistant Examiner — Mohammad Kabir
(74) Attorney, Agent, or Firm — Faegre Baker Daniels LLP

(57) ABSTRACT

The present disclosure discloses a method for providing an activation of a requested software option associated with a base system software. The method may include receiving a request for an activation of a requested software option including an option part number for the requested software option. The software option being installed on the customer system. The method may further include the step of generating an activation code based on the option part number for the requested software option.

25 Claims, 19 Drawing Sheets

U.S. PATENT DOCUMENTS

| | | | |
|---|---|---|---|
| 2005/0149212 A1 | 7/2005 | Geissdorfer et al. | |
| 2005/0194163 A1 | 9/2005 | Wray | |
| 2005/0288809 A1 | 12/2005 | Spaeth et al. | |
| 2006/0010438 A1* | 1/2006 | Brady et al. | 717/174 |
| 2006/0058907 A1 | 3/2006 | Suderman | |
| 2006/0189371 A1* | 8/2006 | Walker et al. | 463/16 |
| 2007/0129826 A1 | 6/2007 | Kreidler et al. | |
| 2007/0234346 A1* | 10/2007 | Kramer et al. | 717/174 |
| 2008/0058993 A1 | 3/2008 | Tain et al. | |
| 2008/0127174 A1* | 5/2008 | Johnson | 717/174 |
| 2008/0222732 A1* | 9/2008 | Caldwell et al. | 726/26 |

OTHER PUBLICATIONS

Davis, Tyler A., *Flexible Machine Tool Control for Direct, In-Process Dimensional Part Inspection*, Master of Science Thesis, Aug. 2004, Dept. of Mechanical Engineering, Brigham Young University, Provo, UT.

Demand filed in PCT/US2009/039632 on Feb. 15, 2010 (11 pages).

Notification concerning informal communications with the application in PCT/US2009/039632 on Jul. 22, 2010 (4 pages).

International Preliminary Report on Patentability in PCT/US2009/039632 on Jul. 22, 2010 (14 pages).

\* cited by examiner

SOFTWARE OPTION SELECTION AND VALIDATION SYSTEM

FIELD OF THE INVENTION

The present invention relates generally to the management and activation of software options. More particularly, the present invention relates to the management and activation of software options for a machine tool system.

BACKGROUND OF THE INVENTION

It is known to provide software packages having one or more options which may be activated. Traditionally in the machine tool industry software options have been activated by codes provided on a hardware key or dongle. The use of a hardware key may result in the dongle being moved from machine tool to machine tool to activate options on multiple machine tools.

SUMMARY OF THE INVENTION

The present disclosure relates to a software options system. In an exemplary embodiment, an activation method is provided for software options. In an example, the activation method is tied to a particular customer system. In another exemplary embodiment, a management method is provided for software options. In an example, the management method is tied to a particular customer system.

In a further exemplary embodiment of the present disclosure, a method for requesting activation of a software option associated with a base system software of a customer system is provided. The method comprising the steps of presenting a listing of one or more software options available for activation with an output device, the one or more software options being installed on the customer system; receiving a selection of at least a first software option to be activated; and requesting an activation code for the first software option including information identifying the first software option and information identifying the customer system. In one example, the method further comprises the steps of receiving an activation code for the first software option; and activating the first software option. In another example, the listing only includes software options which are installed on the customer system. In a further example, the method further comprises the step of presenting a listing of activated software options with the output device. In yet another example, the step of presenting one or more software options available for activation with the output device for at least the first software option includes the step of providing an indication of a subset that the first software option is associated with selected from a plurality of subsets. In one variation thereof, the subset that the first software option is associated with is a fully enabled subset. In another variation thereof, the subset that the first software option is associated with is a timed option. In a further variation thereof, the timed option is associated with a lease term. In yet another variation thereof, the timed option is associated with a promotional term. In still another variation thereof, the subset that the first software option is associated with is a testing option. In still another example, the information identifying the customer system is based on unique information of the customer system including a hard drive serial number of the customer system. In still a further example, the information identifying the customer system is based on unique information of the customer system including a hardware address of the customer system. In yet still another example, the information identifying the customer system is based on unique information of the customer system including an install time of an operating system of the customer system.

In still a further exemplary embodiment of the present disclosure, a method for providing an activation of a requested software option associated with a base system software is provided. The method comprising the steps of receiving a request for an activation of a requested software option including an option part number for the requested software option, the software option being installed on the customer system; and generating an activation code based on the option part number for the requested software option. In one example, the step of receiving a request for an activation of a requested software option including an option part number for the requested software option includes the step of receiving an e-mail including the request. In a variation thereof, the method further comprises the step of determining if the e-mail is from an authorized representative. In another example, the request further includes a machine identification of a customer system associated with the requested software option. In a variation thereof, the machine identification number is based on unique information of the customer system including a hard drive serial number of the customer system. In another variation thereof, the machine identification number is based on unique information of the customer system including a hardware address of the customer system. In a further variation thereof, the machine identification number is based on unique information of the customer system including an install time of an operating system of the customer system. In still a further variation thereof, the request further includes an option request time. In an example, the option request time is represented as a number of seconds from a specific instance in time. In a further example, the activation code is further based on the machine identification. In a variation thereof, the activation code is further based on the machine identification and the option request time. In a further variation, the activation code is further based on the option request time in still another example, the requested software option is a timed software option and the activation code is further based on an amount of time associated with the timed software option.

Additional features and advantages of the present invention will become apparent to those skilled in the art upon consideration of the following detailed description of the illustrative embodiments exemplifying the best mode of carrying out the invention as presently perceived.

BRIEF DESCRIPTION OF THE DRAWINGS

Corresponding reference characters indicate corresponding parts throughout the several views.

DETAILED DESCRIPTION OF THE DRAWINGS

The embodiments disclosed herein are not intended to be exhaustive or limit the invention to the precise form disclosed in the following detailed description. Rather, the embodiments are chosen and described so that others skilled in the art may utilize the teachings.

Figure 1:
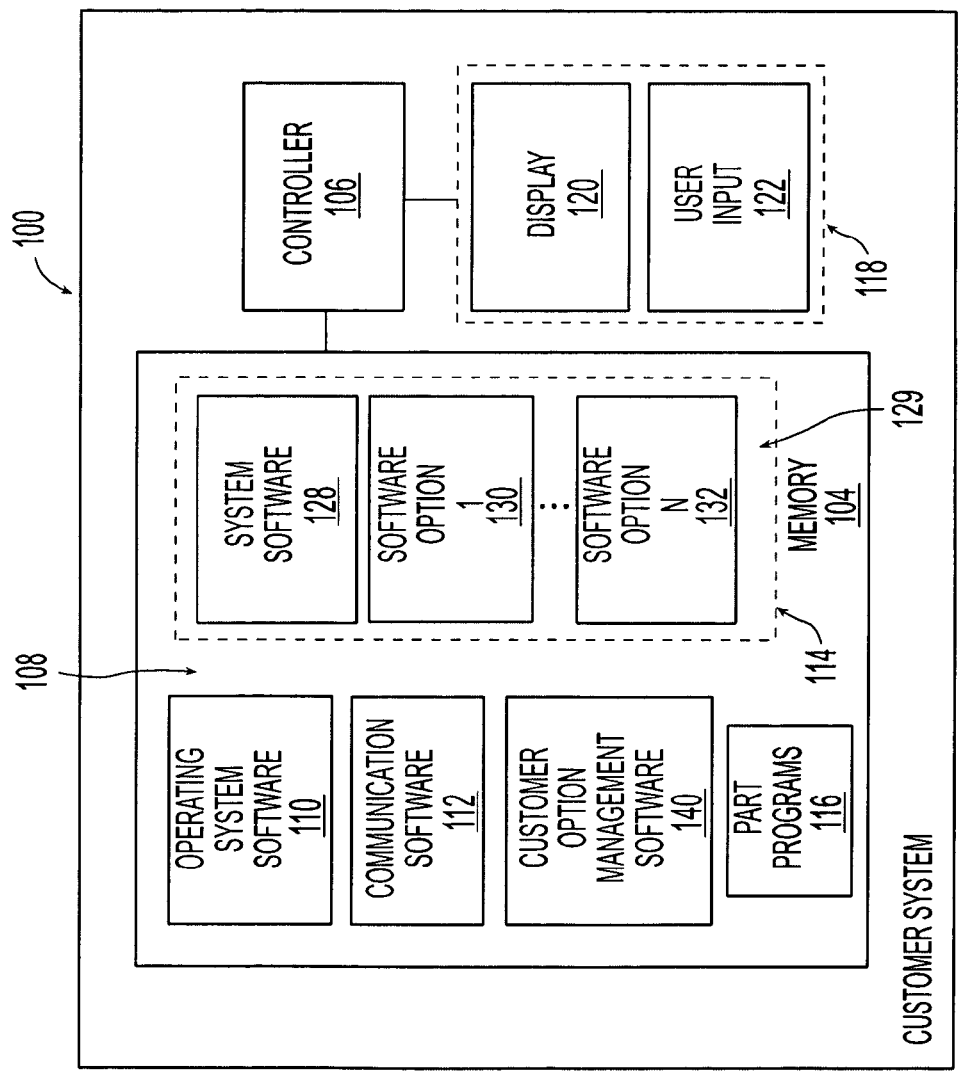
FIG. 1 is a representative view of a customer system.
Figure 2:
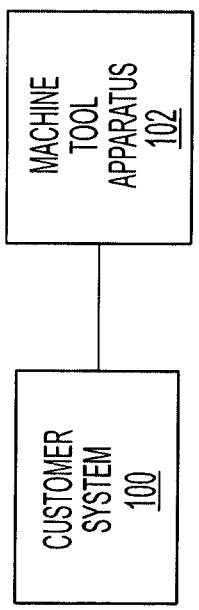
FIG. 2 is a representative view of a customer system coupled to a machine tool apparatus.

Referring to FIG. 1, a customer system 100 is shown. Customer system 100 may be a general purpose computer, a portable computing device, or a computing device coupled to or integrated with a machine tool apparatus 102 (see FIG. 2). In one embodiment, customer system 100 is a stand alone computing device. Exemplary stand alone computing devices include a general purpose computer, such as a desktop computer, a laptop computer, and a tablet computer. In one embodiment, customer system 100 is a computing device associated with machine tool apparatus 102. In this embodiment, customer system 100 may be a part of machine tool apparatus 102 or may be a stand alone computing device which is capable of communicating with machine tool apparatus 102. Exemplary machine tool apparatus 102 include a lathe and a mill. Although customer system 100 is illustrated as a single computing device, it should be understood that multiple computing devices may be used together, such as over a network or other methods of transferring data.

Customer system 100 has access to a memory 104 which is accessible by a controller 106 of customer system 100. Controller 106 executes software 108 stored on the memory 104. Memory 104 is a computer readable medium and may be a single storage device or may include multiple storage devices, located either locally with customer system 100 or accessible across a network. Computer-readable media may be any available media that may be accessed by controller 106 of customer system 100 and includes both volatile and non-volatile media. Further, computer readable-media may be one or both of removable and non-removable media. By way of example, computer-readable media may include, but is not limited to, RAM, ROM, EEPROM, flash memory or other memory technology, CD-ROM, Digital Versatile Disk (DVD) or other optical disk storage, magnetic cassettes, magnetic tape, magnetic disk storage or other magnetic storage devices, or any other medium which may be used to store the desired information and which may be accessed by the customer system 100.

Memory 104 includes an operating system software 110. An exemplary operating system software is a WINDOWS operating system available from Microsoft Corporation of Redmond, Wash. Memory 104 further includes communications software 112, if customer system 100 has access to a network, such as a local area network or a public switched network. An exemplary public switched network is the Internet. Exemplary communications software 112 includes e-mail software, internet browser software, and other types of software which permit customer system 100 to communicate with other devices across a network.

Memory 104 further includes machine tool software 114. An exemplary machine tool software 114 is the WINMAX brand machine tool software available from Hurco Companies, Inc. located at One Technology Way in Indianapolis, Ind. Machine tool software 114 is capable of reading one or more part programs 116 which provide the desired tool paths for machine tool apparatus 102 or the desired geometry of a part to be made by machine tool apparatus 102.

One exemplary part program is an NC program. NC part programs are frequently expressed in a standard G&M code language, or a close derivative of this language based on either the International Standards Organization (ISO) or the Electronics Industries Association (EIA) RS-274-D, using codes identified by letters such as G, M, F. The codes define a sequence of machining operations to control motion in the manufacture of a part. Controller 106 may convert the codes to a series of electrical signals which are provided to control motors attached to machine tool 102 effecting the motion of the tool along the programmed trajectory either by moving the part relative to the tool, moving the tool relative to the part, or a combination thereof.

Another exemplary part program is a conversational part program which is provided through an interaction with machine tool software 114 by way of a user interface 118 of customer system 100. User interface 118 includes a display 120 and one or more user inputs 122. Exemplary user inputs 122 include a keyboard, a mouse, a roller ball, a touch screen, soft keys, one or more buttons, one or more dials, one or more switches, or a combination thereof.

In one example, a user may specify the desired geometry through the programming of data blocks with the user interface 118. An exemplary method of conversational programming is disclosed in U.S. Pat. No. 5,453,933, assigned to the assignee of the current application, the disclosure of which is expressly incorporated by reference herein. During a conversational programming session, the user may program the desired geometry for the machined part and specify one or more attributes. In one example, the user specifies the desired geometry for the machined part by creating blocks of code each of which specifies a tool and a trajectory of the tool. As such, the geometry of the machined part is defined based on the operations used to create the machined part.

Machine tool software 114 includes a base system software component 128 and a plurality of software option components 129, illustratively software option component 130 and software option component 132. Although two software option components are shown, any number of software options may be included. The base system software component 128 provides a base system for customer system 100. Software option components 130 and 132 provide additional add-on software to expand the capabilities of base system software component 128 and/or provide additional software. It should be understood that base system software component 128, software option component 130, and software option component 132 may be a part of or share one or more files or may be separate files.

Memory 104 further includes a customer option management software 140. Customer option management software 140 has multiple roles. Customer option management software 140 provides an interface whereby an operator of customer system 100 may request activation of one or more software options. In one embodiment, the software options are stored on memory 104 and only need to be activated, not downloaded themselves. In one embodiment, customer option management software 140 retrieves a listing of software options 129 that are installed on customer system 100 from a file stored on memory 104. Customer option management software 140 provides input to machine tool software 114 to indicate whether a requested software component, such as base system software component 128, software option component 130, or software option component 132, is activated.

Figure 3:
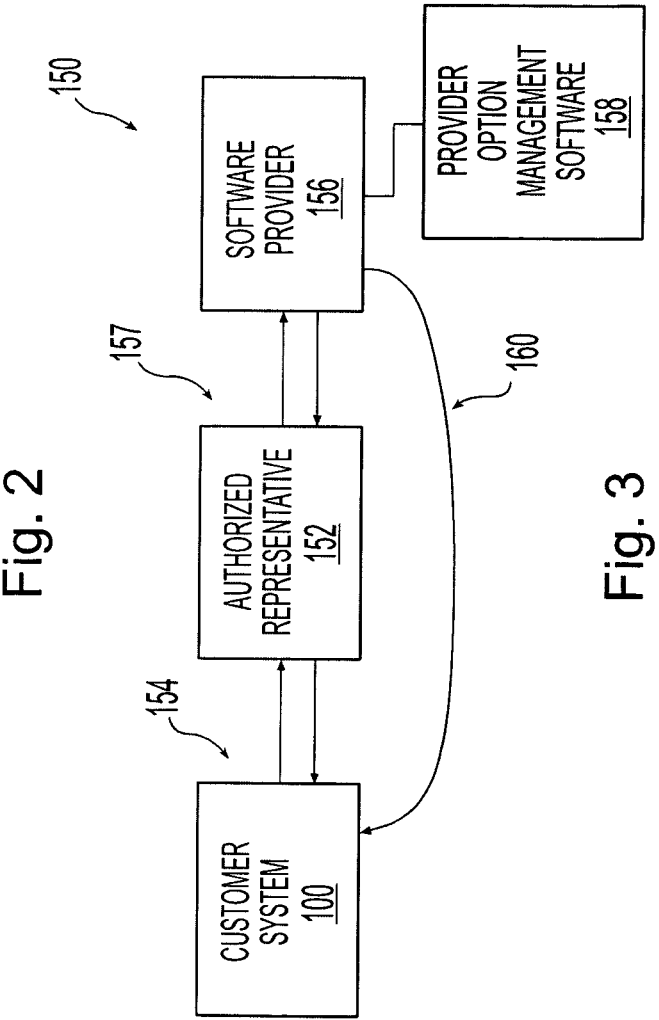
FIG. 3 is a representative flowchart of the interactions between a customer system, an authorized representative, and a software provider.

Referring to FIG. 3, an exemplary method 150 of activating software options, software option component 130 or software option component 132, is shown. Customer system 100 communicates with an authorized representative 152 over one or more networks 154. Networks 154 may be any type of suitable networks, such as wired networks, wireless networks, cellular networks, public switched networks, private networks, and combinations thereof. Authorized representative 152 communicates with a software provider 156 over one or more networks 157. Networks 157 may be any type of suitable networks, such as wired networks, wireless networks, cellular networks, public switched networks, private networks, and combinations thereof.

Software provider 156 is defined as an entity or a plurality of entities which decide and/or communicate an indication of a decision whether or not to activate a requested software option. In one embodiment, the software provider is the company which develops and/or provides machine tool software 114. In one embodiment, the software provider is an agent of the company which develops and/or provides machine tool software 114.

Authorized representative 152 is defined as an entity or a plurality of entities which interface with requests from customer system 100. In one embodiment, authorized representative 152 is a reseller of machine tool software 114, a representative of software provider 156, such as a sales representative, or any other entity which interacts with customer system 100 to provide and/or support machine tool software 114.

In operation, an operator of customer system 100 requests activation of one or more software options by communicating such a request to authorized representative 152, the software options having already been stored on memory 104 of customer system 100. In one embodiment, this request is provided to authorized representative 152 over networks 154. In one embodiment, this request is provided in other manners, such as through a fax, mail, or a telephone conversation with a representative of authorized representative 152.

Authorized representative 152 receives the request from customer system 100. Authorized representative 152 provides the request or an indication of the request to software provider 156. In one embodiment, the request or an indication of the request is provided to software provider 156 over networks 157.

Software provider 156 receives the request or the indication of the request. Software provider 156 provides the request or the indication of the request to provider option management software 158. Provider option management software 158 based on the request or the indication of the request determines whether to provide activation codes for the one or more software options or not. In one embodiment, the activation codes and/or the denial of activation is provided by software provider 156 to customer system 100 through a network 160. In one embodiment, network 154, network 157, and network 160 each include a common network, such as the Internet or other publicly switched network. In one embodiment, the activation codes or the denial of activation is provided by software provider is provided to authorized representative 152. Authorized representative 152, in turn, provides the activation codes or the denial of activation to customer system 100.

Figure 4:
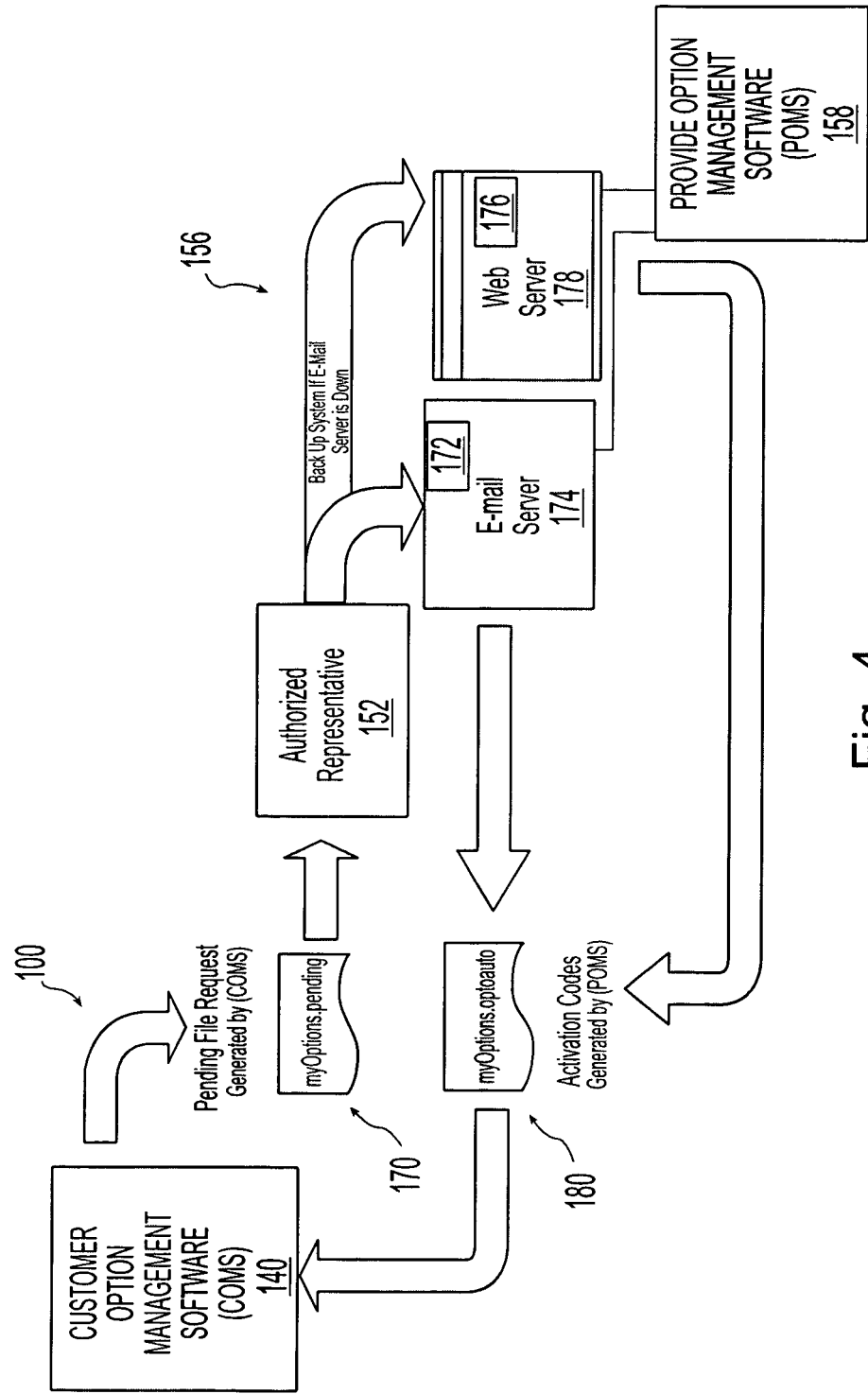
FIG. 4 is an exemplary flowchart of the interactions of FIG. 3.

Referring to FIG. 4, one embodiment of method 150 is shown. Customer option management software 140 receives from an operator of customer system 100, the requested software options for activation. The requested options are provided in a request 170. In one embodiment, request 170 is a file which includes information regarding the requested options and information regarding customer system 100. The request 170 is provided to authorized representative 152. In one embodiment, request 170 is provided over networks 154. In one embodiment, authorized representative 152 retrieves request 170 from customer system 100. In one example, authorized representative 152 copies request 170 from memory 104 to a removable memory. Exemplary removable memory include diskettes, thumb drives, and other types of portable memory.

Authorized representative 152 then provides request 170 or an indication of request 170 to software provider 156. Two exemplary methods of providing request 170 or an indication of request 170 to software provider 156 are shown. In a first embodiment, request 170 is attached to or otherwise associated with an e-mail 172 which is sent from authorized representative 152 to an e-mail server 174 associated with software provider 156. In a second embodiment, request 170 or an indication of request 170 is provided to software provider 156 through a web page 176 presented to authorized representative 152 by a web server 178 associated with software provider 156. Regardless of the manner of communicating request 170 or an indication of request 170 to software provider 156, provider option management software 158 reviews the information provided and makes a determination whether to provide activation codes for one or more of the requested software options or to deny the requested activation codes for one or more of the requested software options. In one embodiment, provider option management software 158 provides activation codes for a first portion of the requested software options and denies activation for a second portion of the requested software options.

This determination by provider option management software 158 or an indication thereof is provided in a response 180. Response 180 is provided either directly to customer system 100 by software provider 156 or is provided to an intermediary by software provider 156 which in turn provides it to customer system 100. In one embodiment, the intermediary is authorized representative 152. Regardless of the route of communicating response 180 to customer system 100, customer option management software 140 interprets response 180 and provides an indication to an operator of customer system 100 whether the requested software options have been activated or not. In one embodiment, the indication is a visual indication on display 120.

Figure 5:
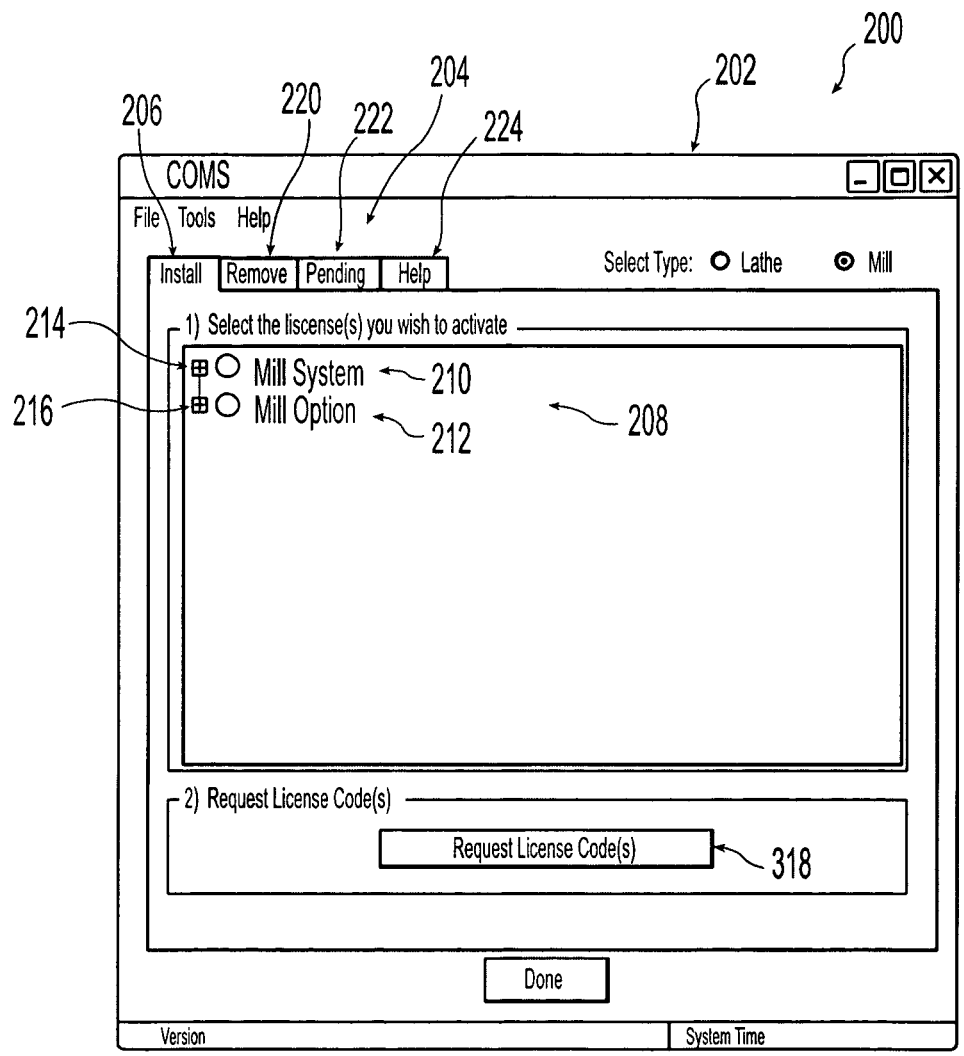
FIG. 5 is a screen shot of the options management software of the customer system.
Figure 6:
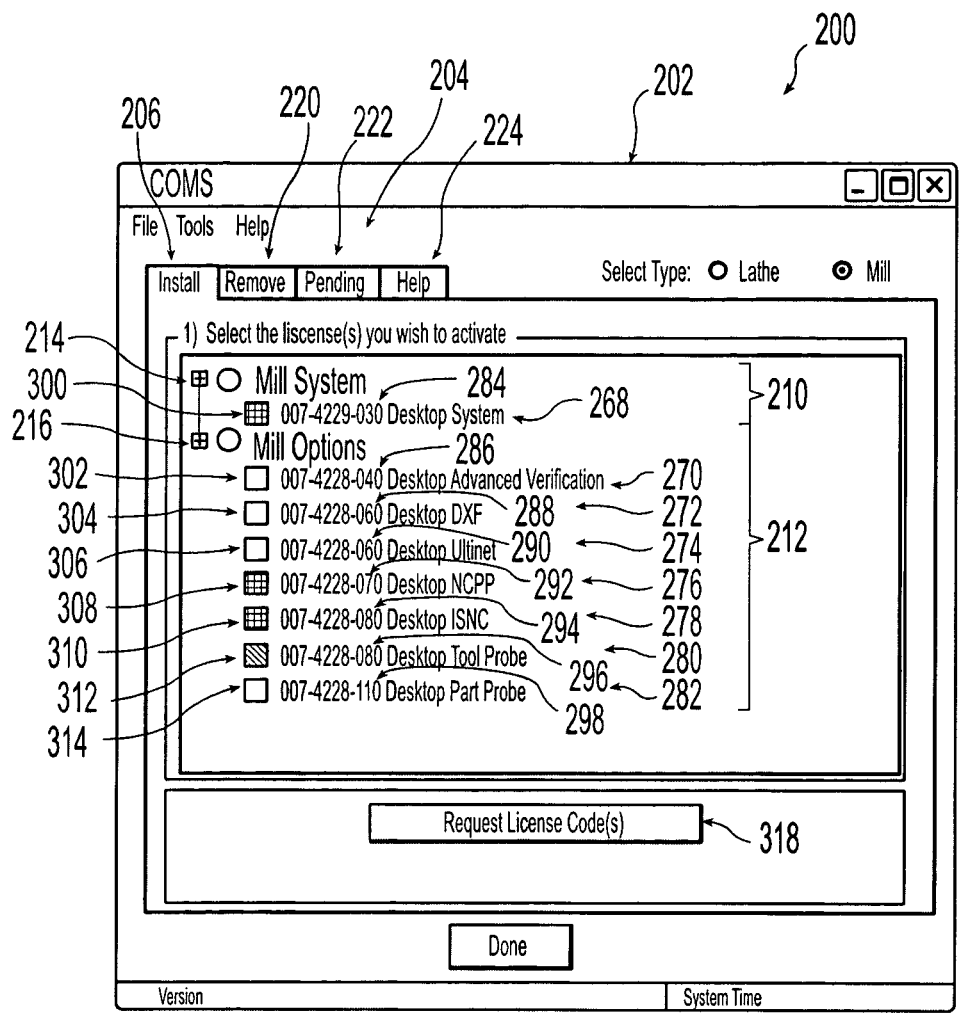
FIG. 6 is another screen shot of the options management software of FIG. 5 illustrating an install tab including an active system software, two active software options, one pending software option, and four available software options.

A user interface 200 of customer option management software 140 is shown in FIGS. 5-7 and 11-15. Referring to FIG. 5, user interface 200 includes a window 202 which includes a plurality of tabs 204. An install tab 206 provides a listing 208 of machine tool software 114 installed on customer system 100. Listing 208 includes top level categories 210 and 212 which may be expanded by clicking on icons 214 and 216, respectively, with a user input device. As shown in FIG. 6, category 210 provides a listing of the base system software component 128 installed on customer system 100 and category 212 provides a listing of software option components 129 installed on customer system 100.

Returning to FIG. 5, a remove tab 220 which provides a listing of activated base system software component 128 and software option components 129 is provided. An operator may select one or more software components to deactivate. In one embodiment, a user may desire to deactivate a software option component 129. In one example, a user may desire to deactivate a software option due to hardware incompatibility of the software option. In one example, a user may desire to deactivate a software option to obtain a monetary credit for an unused term of a timed option. A pending tab 222 provides a listing of software option components 129 which have been selected for activation, but for which a request 170 has not yet been sent. A help tab 224 provides general information about how to use the customer options management software 140.

Figure 8:
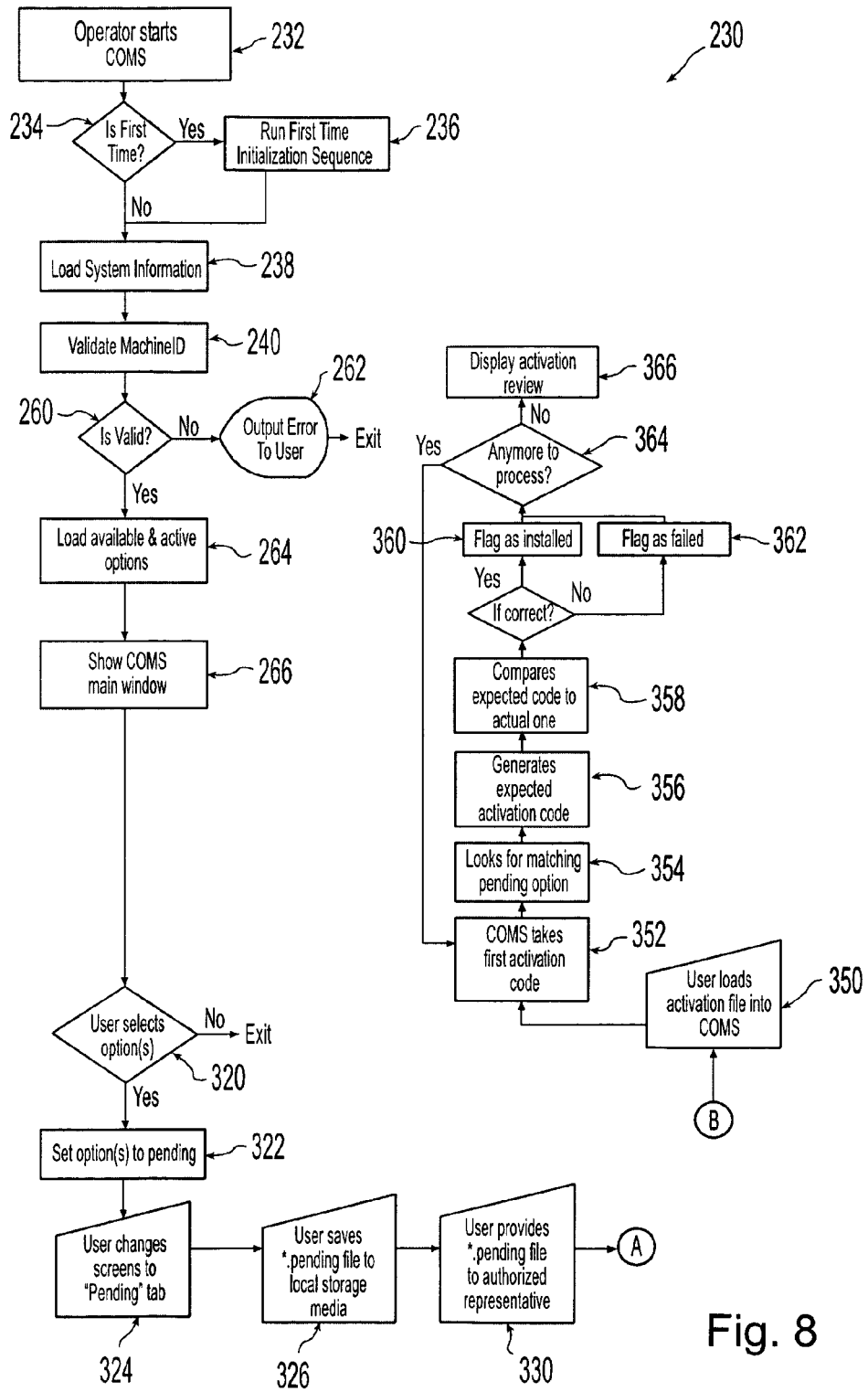
FIG. 8 is an exemplary flowchart of the operations of the options management software of the customer system.

Turning to FIG. 8, an exemplary process 230 of activating software options 129 with user interface 200 and the method of FIG. 4 is shown. An operator of customer system 100 launches customer option management software 140, as represented by block 232. A check is made by customer option management software 140 to determine if this is the first time customer option management software 140 has been launched, as represented by 234. If it is the first time that customer option management software 140 has been launched, then a first time initialization sequence is performed by customer option management software 140, as represented by block 236. In one embodiment, first time initialization sequence includes routines to create the unique machine identification 242 and to receive through a user interface screen specific serial numbers for tracking management. Exemplary serial numbers include a serial number of the machine frame of machine tool apparatus 102, a serial number for a first operating system software 110, and a serial number for a real time operating system. An exemplary operating system software 110 is Windows XP available from Microsoft Corporation of Redmond, Wash. An exemplary real time operating system is RTX available from Ardence, a Citrix Company, located at 266 2nd Avenue in Waltham, Mass.

If it is not the first time that customer option management software 140 has been launched or subsequent to the completion of the first time initialization sequence, the customer system information is loaded, as represented by block 238. The customer system information includes the machine identification number and other unique machine serial numbers provided on of the machine frame of machine tool apparatus, a first operating system software 110, and a serial number for a real time operating system. The customer system numbers and the machine identification 242 may all be used for tracking management.

Figure 18:
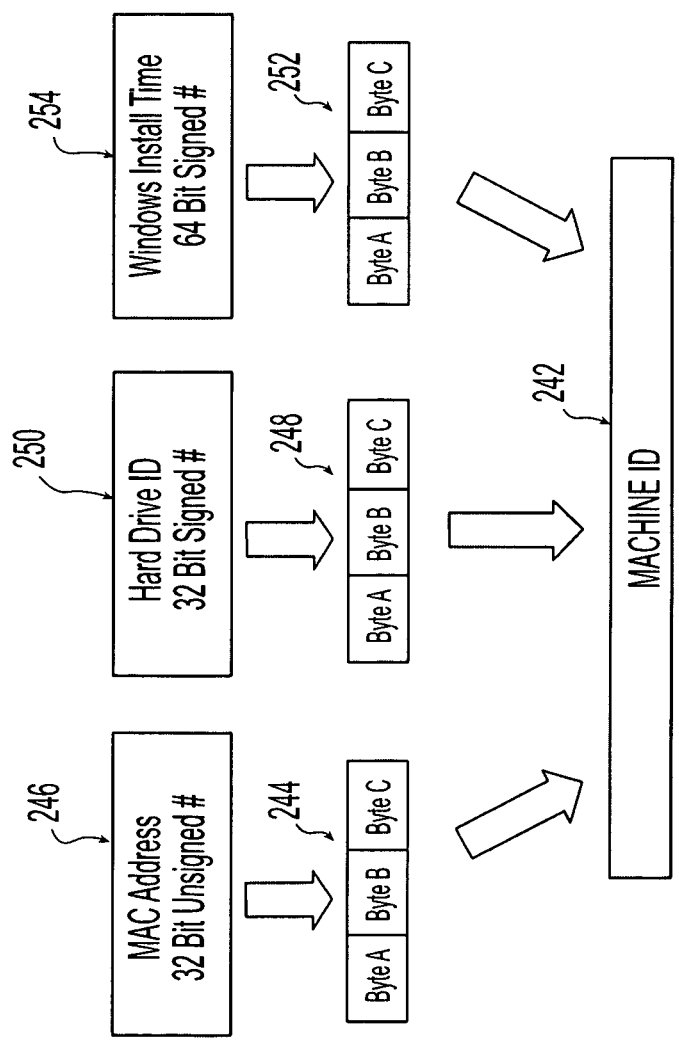
FIG. 18 is a representative view of an exemplary creation of a machine identification.

Customer option management software 140 next verifies the machine identification number 242, as represented by block 240. The machine identification number 242 is a unique identifier for customer system 100. In one embodiment, a machine identification number 242 is generated on the fly by customer option management software 140 during the first time initialization sequence. Machine identification number 242 is based on information which uniquely identifies customer system 100 and which is known by software provider 156 during production of customer system 100. Referring to FIG. 18, in one embodiment, machine identification number 242 is based on a portion 244 of a hardware address 246 of customer system 100, a portion 248 of a hard drive serial number 250 of customer system 100, and a portion 252 of an install time 254 of the operating system 110 of customer system 100. In one embodiment, portion 244, portion 248, and portion 252 are each based on the three lowest order bytes of hardware address 246, hard drive serial number 250, and install time 254, respectively. In one embodiment, machine identification number 242 is comprised of a leading byte followed by a rearrangement of the bytes of portion 244, portion 248, and portion 252. In one embodiment, the bytes of portion 244, portion 248, and portion 252 are rearranged to each form a new three byte number and each of the three new three byte numbers are rearranged with each other to form machine identification number 242. An exemplary machine identification number 242 is provided in box 380 in FIG. 7.

Returning to FIG. 8, customer option management software 140 determines if a stored machine identification number 242 is equal to a determined machine identification number 242, as represented by block 260. Since hardware address 246, hard drive serial number 250, and install time 254 are available to customer option management software 140, customer option management software 140 is able to determine what the stored machine identification number 242 should be. As such, customer option management software 140 is able to detect if a new hard drive was installed or other changes have been made. If the determined machine identification number 242 does not match the stored machine identification number 242, customer option management software 140 outputs this as an error to the operator, as represented by block 262. In one embodiment, an error message is provided on display 120. If the determined machine identification number 242 matches the stored machine identification number 242, customer option management software 140 provides an output of available and active options, as represented by 264. In one embodiment, this is done by presenting window 202 to the operator, as represented by block 266.

Turning to FIG. 6, install tab 206 of window 202 is selected. Install tab 206 is presented when window 202 is launched. As shown in FIG. 6, top level categories 210 includes a single base system software component 128, namely Desktop System 268. Further, category 212 includes seven software option components 129, namely Desktop Advanced Verification 270, Desktop DXF 272, Desktop Ultinet 274, Desktop NCPP 276, Desktop ISNC 278, Desktop Tool Probe 280, and Desktop Part Probe 282.

Each of the single base system software component 128 and the seven software option components 129 has an option part number 284-298 associated therewith and a visual marker 300-314 associated therewith. The option part number provides the type of option of the respective software component. The option part number may include numbers, letters, and/or other symbols.

Each of the illustrated option numbers have the following form XXX-XXXX-XX0. The first portion of the option code (represented by the "X"s) identifies the specific option while the second portion (represented by the "0") represents the option type. Type "0" indicates a fully enabled option. This means once activated, the option is enabled and will not expire unless removed. Type "1" corresponds to a testing option and is described in more detail herein in connection with FIGS. 16 and 17. Types "2"-"5" correspond to timed options. Each of types "2", "3", "4", and "5" correspond to a different length of time, such as 30 days, 60 days, 90 days, and 120 days. Types "6"-"9" may be used for additional types of options. In one example, type "8" may correspond to a promotional option, such as to permit a customer to try the option for a limited time free of charge.

The visual markers 300-314 provide a visual cue as to the current status of base system software component 128 and each of software option components 129. In FIG. 6, the grid pattern of visual marker 300, visual marker 308, and visual marker 310 indicate that the respective software components Desktop System 268, Desktop NCPP 276, and Desktop ISNC 278 are installed and active. The hatched pattern of visual marker 312 indicates that Desktop Tool Probe 280 is installed and pending; meaning an activation code has been requested, but that a response has not yet been received. The open pattern of visual markers 302, 304, 306, and 314 indicate that Desktop Advanced Verification 270, Desktop DXF 272, Desktop Ultinet 274, and Desktop Part Probe 282 are installed, but that a request to activate has not been generated by customer options management software 140.

Figure 7:
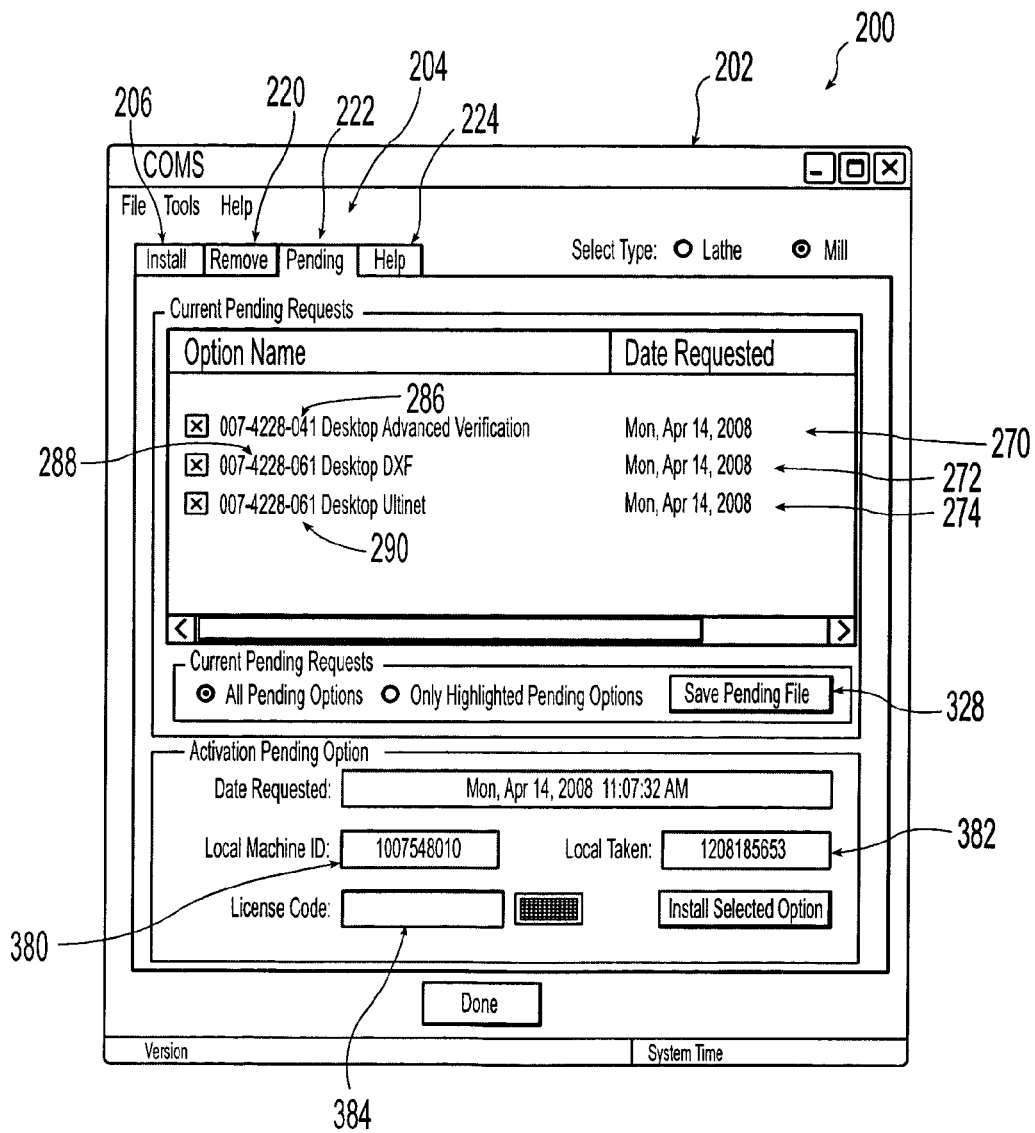
FIG. 7 is another screen shot of the options management software of FIG. 6 illustrating a pending tab including three software options being requested.

Returning to FIG. 8, an operator selects which options to have activated on customer system 100, as represented by block 320. Referring to FIG. 6, an operator would select the requested options, such as options Desktop Advanced Verification 270, Desktop DXF 272, and Desktop Ultinet 274 and select the request license codes input 318. The selected options are set to pending as represented by block 322 in FIG. 8. The user then changes to pending tab 222 is represented by block 324 and shown in FIG. 7. As shown in FIG. 7, only the selected options for activation are shown on the listing of the pending tab 222. The visual markers 302, 304, and 306 have been changed to show an "x". Next, the operator saves a file to memory 104 which includes the option part numbers for the selected options 270-274 and the machine identification 242, as represented by block 326. This is accomplished by selecting input 328 in FIG. 7. In one embodiment, the file includes an extension of ".pending" to indicate that it is an activation code request file.

The pending file, in one embodiment, is structured using the industry standard XML format. The file includes the customer's unique machine identification, any serial numbers provided as part of the customer system information, and the options being requested. For each option being requested, the pending file includes the actual option part number XXX-XXXX-XXX, as well as, a time stamp indicating exactly when the option was requested, and a unique hash code that includes the option part number itself as well as the machine identification and timestamp.

Once the *.pending file has been stored on memory 104, the operator provides it to authorized representative 152, as represented by block 330. This may be accomplished in multiple ways. The *.pending file may be attached to an e-mail and sent to authorized representative 152 over network 154. The *.pending file may be sent to authorized representative 152 over network 154 in forms other than e-mail. In situations wherein customer system 100 does not have access to network 154, the *.pending file may be copied onto a removable memory device which is provided to authorized representative 152.

Figures 9, 10:
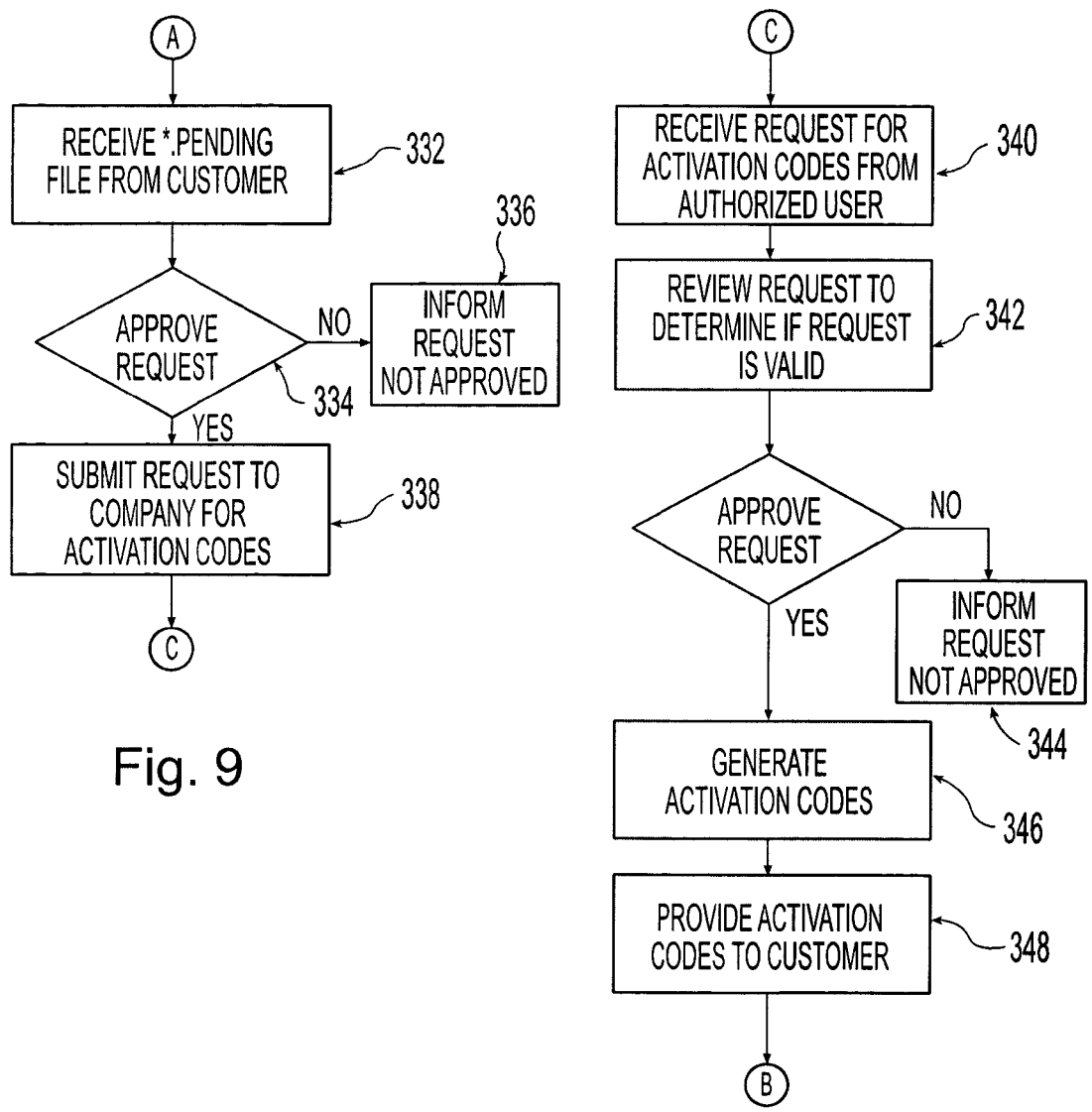
FIG. 9 is an exemplary flowchart of the operations of an authorized representative.
FIG. 10 is an exemplary flowchart of the operations of the provider options management software of a software provider.

Referring to FIG. 9, authorized representative 152 receives the *.pending file from customer system 100, as represented by block 332. Authorized representative 152 then reviews the *.pending file or the source of the *.pending file to determine if it is from a legitimate customer system 100, as represented by block 334. If authorized representative 152 does not recognize the source of the *.pending file or believes the source of the *.pending file is not allowed to activate further options, then authorized representative 152 denies the request and informs the source that the request has been denied, as represented by block 336. One example of wherein authorized representative 152 would deny the request is wherein the requesting party has a past due balance on their account.

If authorized representative 152 approves the request, authorized representative 152 submits the request to software provider 156, as represented by block 338. In one embodiment, authorized representative 152 submits the request to software provider 156 through one or more networks 157. As explained in relation to FIG. 4, authorized representative 152 may provide the request to software provider 156 through two different methods.

In one embodiment, authorized representative 152 may send an e-mail message to e-mail server 174 with the *.pending file as an attachment. In one example, the e-mail message needs to have a code word in the subject line to prompt customer options management software 158 that this e-mail is a request for activation codes. In one example, the code word is "Opticlient". Further, the e-mail is checked to determine if it is from an recognized e-mail address, associated with authorized representative 152.

In one embodiment, promotional activation key requests have a different code word requirement in the subject line. With the promotional code word in the subject line only promotional or timed options may be activated.

Referring to FIG. 10, provider options management software 158 receives a request from an authorized representative 152, as represented by block 340. In one embodiment, provider options management software 158 checks the sender's email address against a listing of valid e-mail addresses to verify that authorized representative 152 is truly an authorized user. Next, provider options management software 158 reviews the attachment *.pending file to determine if the requested options are valid options, as represented by block 342. In one embodiment, provider options management software 158 checks the requested options against a list of options for which payment has been received.

Figure 20:
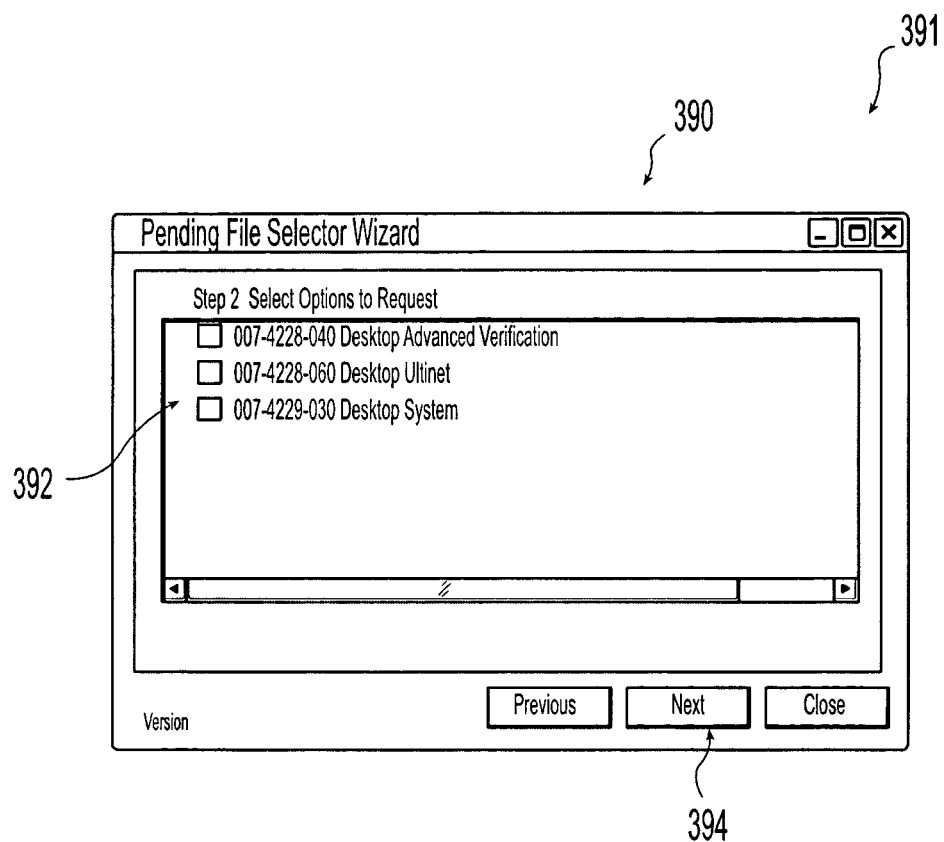
FIG. 20 is a representative view of a user interface of the provider option management software to select valid options from a customer's activation request for processing for activation codes.

In one embodiment, the comparison is performed manually by an operator of the provider options management software 158. FIG. 20 illustrates a window 390 of a user interface 391 of the provider options management system 158 which presents a listing of the requested options. An operator would compare this listing to paid options from a sales order and select the options which are on both lists with input boxes 392. Once the paid options had been selected, the operator would select the next button 394 and provider options management software 158 generates the activation codes.

If the request is not approved, then the authorized representative 152 and/or customer system 100 are informed that the request was denied, as represented by block 344. If the request was approved, provider options management software 158 generates the activation codes, as represented by block 346. In one embodiment, the activation code is determined from a hashed number composed of the machine identification 242, the option part number (XXXXXXXXXX), and the option request time. In one embodiment, the option request time is represented as the number of seconds from a specific instance in time. If the activation code is for a timed option the number of days of the timed option is included as well. The number is input into a random number generator that provides another number which is then bit shifted. This final number is the activation code. The activation code is also generated by customer options management software 140 to compare to the activation code generated by the provider options management software 158.

In one embodiment, the requested options may have a first portion of options which are approved and a second portion of options which are denied. Next, the activation codes are provided to customer system 100, as represented by block 348. The activation codes may be provided directly to customer system 100 over network 160 or to authorized representative 152 through network 157.

An advantage of interfacing with provider options management software 158 through e-mail server 174 is that the process from the submission of the request, the approval or disapproval of the request, and through to the communication of the activation codes may be handled without human intervention.

Figure 21:
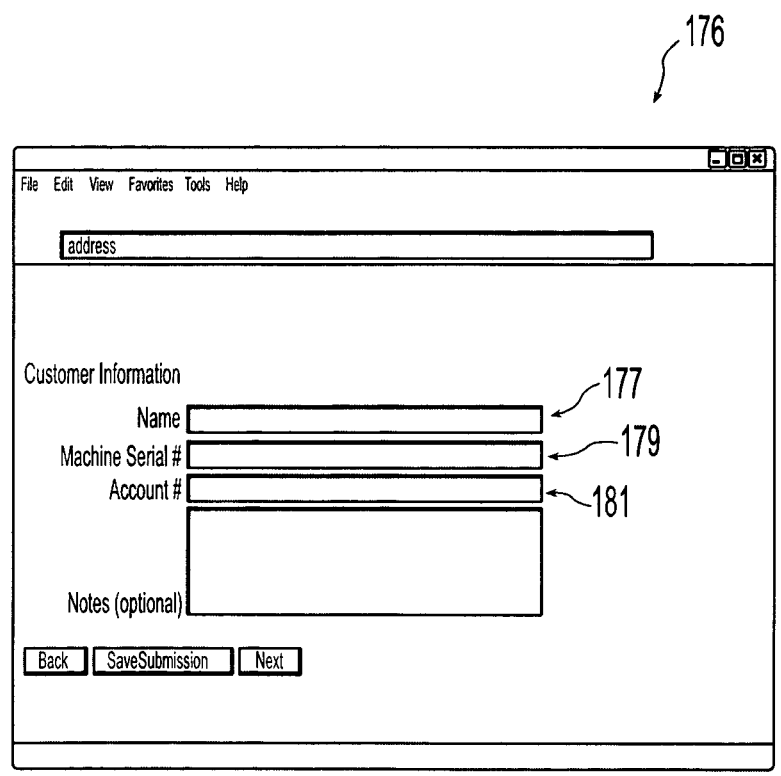
FIG. 21 is a representative view of the web page of FIG. 4.

In one embodiment, authorized representative 152 provides the request to software provider 156 through a web page 176 presented by web server 178. Referring to FIG. 21, an example of web page 176 is shown. Web page 176 provides inputs for the customer information (name 177, machine serial number 179, and account 181). On the same web page or a linked page the user also provides the options to be activated (option part number), inputs the machine identification 242 (see number provided in box 380 on the pending tab 222 of customer option management software 140 in FIG. 7), and inputs the timestamp (see number provided in box 382 on the pending tab 222 of customer option management software 140 in FIG. 7) for the requested options. The entries are submitted to provider options management software 158 which provides back the activation codes. The activation codes are copied down and input into customer system 100 through input box 384 (see FIG. 7).

Returning to FIG. 8, customer system 100 receives the activation codes. The activation codes are loaded into customer option management software 140, as represented by block 350. In one embodiment, the activation codes are provided in a file named, myOptions.optoauto which is stored to memory 104. A user then drops an icon representing the file onto window 202 to begin the processing of the activation codes.

Customer option management software 140 reads the first activation code from the myOptions.optoauto file, as represented by block 352. The option part number associated with the first activation code may be extracted from the first activation code. Customer option management software 140 looks for a matching pending option, as represented by block 354. If a match is found, customer option management software 140 generates the expected activation code, as represented by block 356. The expected activation code is then compared to the received activation code, as represented by block 358. If a match is not found the received activation code is invalid.

If the expected activation code matches the received activation code, then the pending option is flagged as installed, as represented by block 360. If the expected activation code does not match the received activation code, then the pending option is flagged as failed, as represented by block 362. Either way, customer option management software 140 checks the myOptions.optoauto file to see if there are any further activation codes to process, as represented by block 364. If so, blocks 352-364 are repeated for the next activation code. If not, an activation review is displayed, as represented by block 366. In one embodiment, the activation review is window 202 with the install tab 206 selected.

Referring back to FIG. 7, Desktop Advanced Verification 270, Desktop DXF 272, and Desktop Ultinet 274 were available for activation and were subsequently requested as shown in FIG. 8. Further, Desktop Tool Probe 280 had been requested in a prior request.

Figure 11:
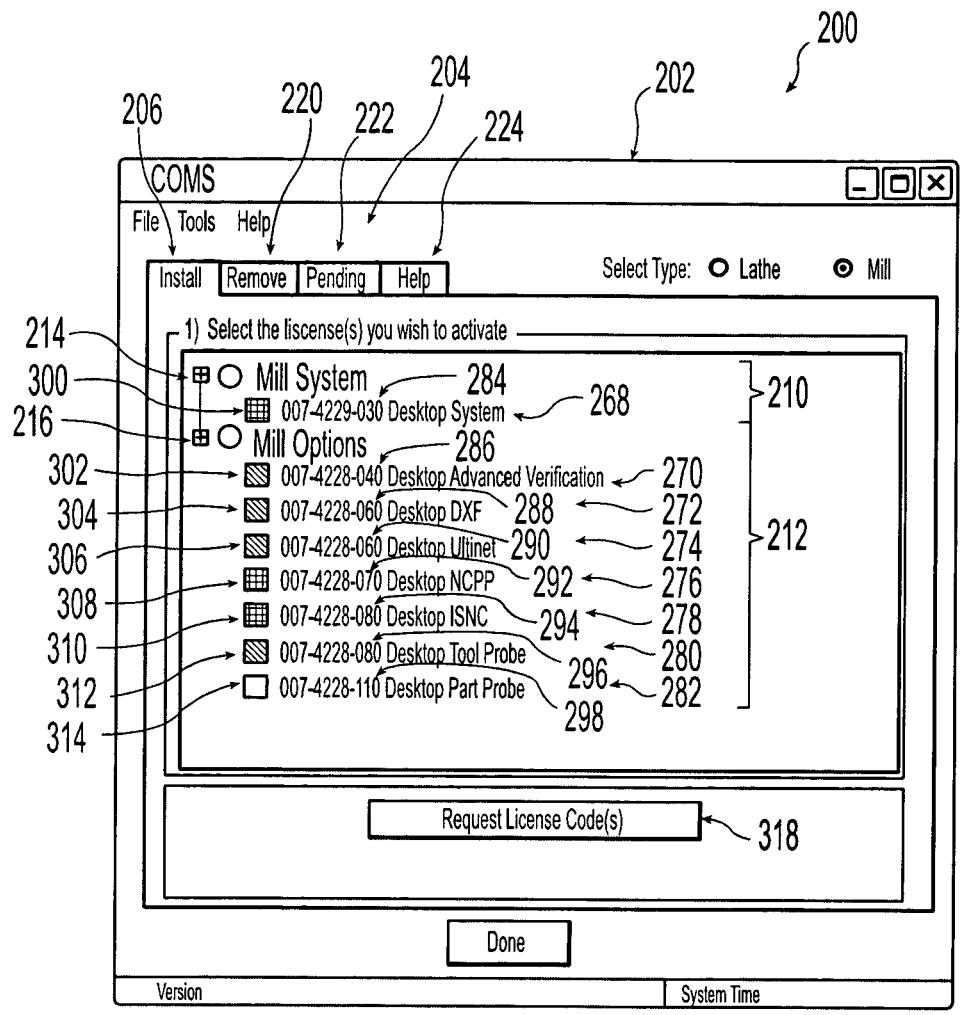
FIG. 11 is another screen shot of the options management software of FIG. 5 illustrating an install tab including an active system software, two active software options, four pending software options, and one available software option.
Figure 12:
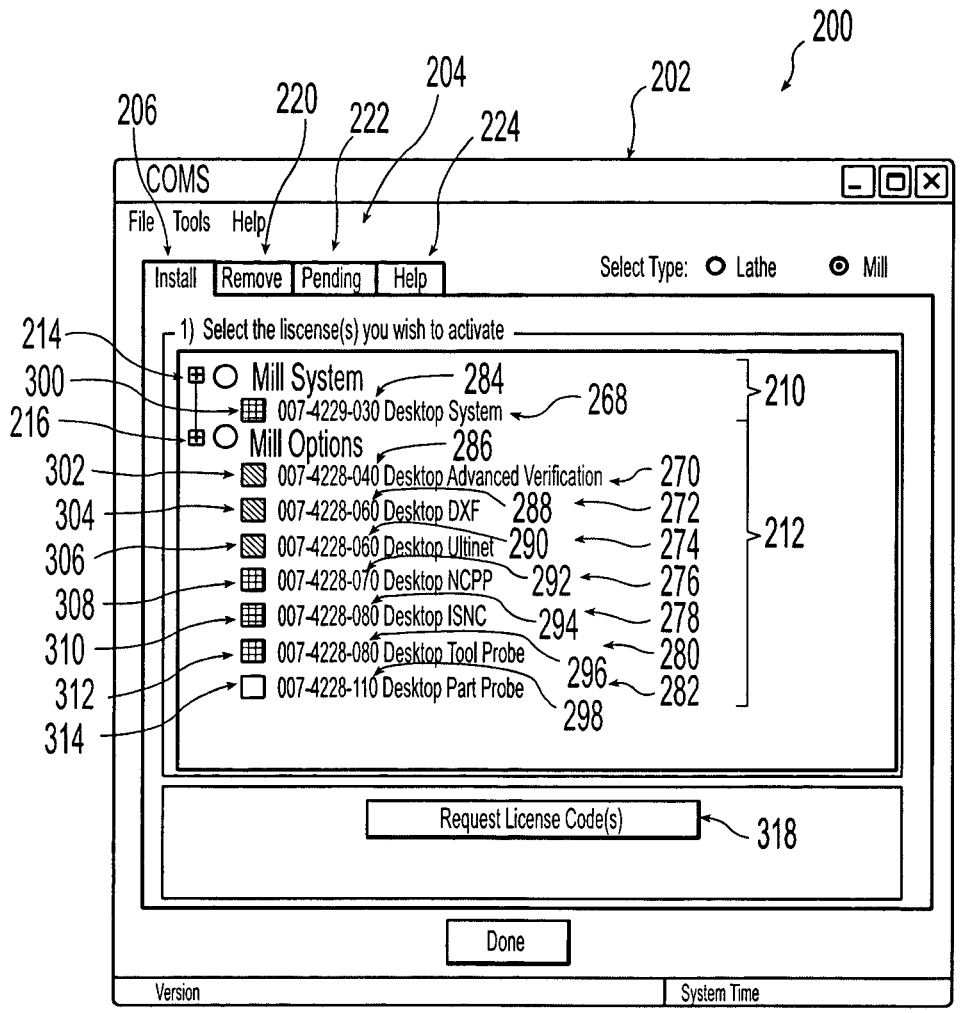
FIG. 12 is another screen shot of the options management software of FIG. 5 illustrating an install tab including an active system software, three active software options, three pending software options, and one available software option.

Referring to FIG. 11, install tab 206 is shown after the request for activation of Desktop Advanced Verification 270, Desktop DXF 272, and Desktop Ultinet 274 had been requested. Each of Desktop Advanced Verification 270, Desktop DXF 272, Desktop Ultinet 274, and Desktop Tool Probe 280 are shown as pending by their respective visual markers 302, 304, 306, and 312. Referring to FIG. 12, one possible scenario is shown wherein Desktop Advanced Verification 270, Desktop DXF 272, and Desktop Ultinet 274 are still shown as pending while Desktop Tool Probe 280 is shown as activated. As such, a response had been received by customer option management software 140 regarding Desktop Tool Probe 280 that was favorable and customer option management software 140 was able to generate a matching activation code.

Figure 13:
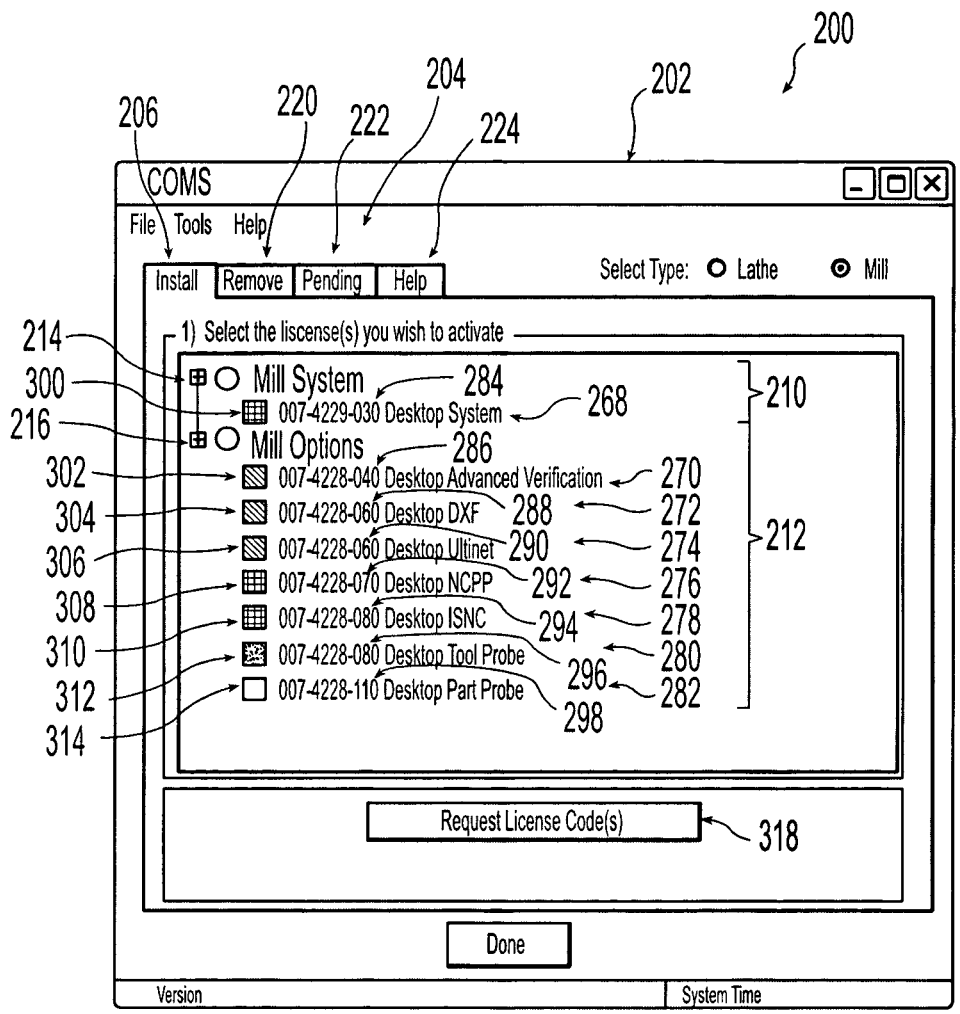
FIG. 13 is another screen shot of the options management software of FIG. 5 illustrating an install tab including an active system software, two active software options, three pending software options, one denied software option, and one available software option.

Referring to FIG. 13, another possible scenario is shown wherein Desktop Advanced Verification 270, Desktop DXF 272, and Desktop Ultinet 274 are shown as active while Desktop Tool Probe 280 is shown as denied, indicated by the dotted fill of visual marker 312. As such, a response for Desktop Tool Probe 280 was received by customer option management software 140, but either the response provided an indication of denial of activation of Desktop Tool Probe 280 or customer option management software 140 was unable to generate a matching activation code. Further, a second response was received by customer option management software 140 regarding Desktop Advanced Verification 270, Desktop DXF 272, and Desktop Ultinet 274 that was favorable and customer option management software 140 was able to generate a matching activation code for each of Desktop Advanced Verification 270, Desktop DXF 272, and Desktop Ultinet 274.

Figure 14:
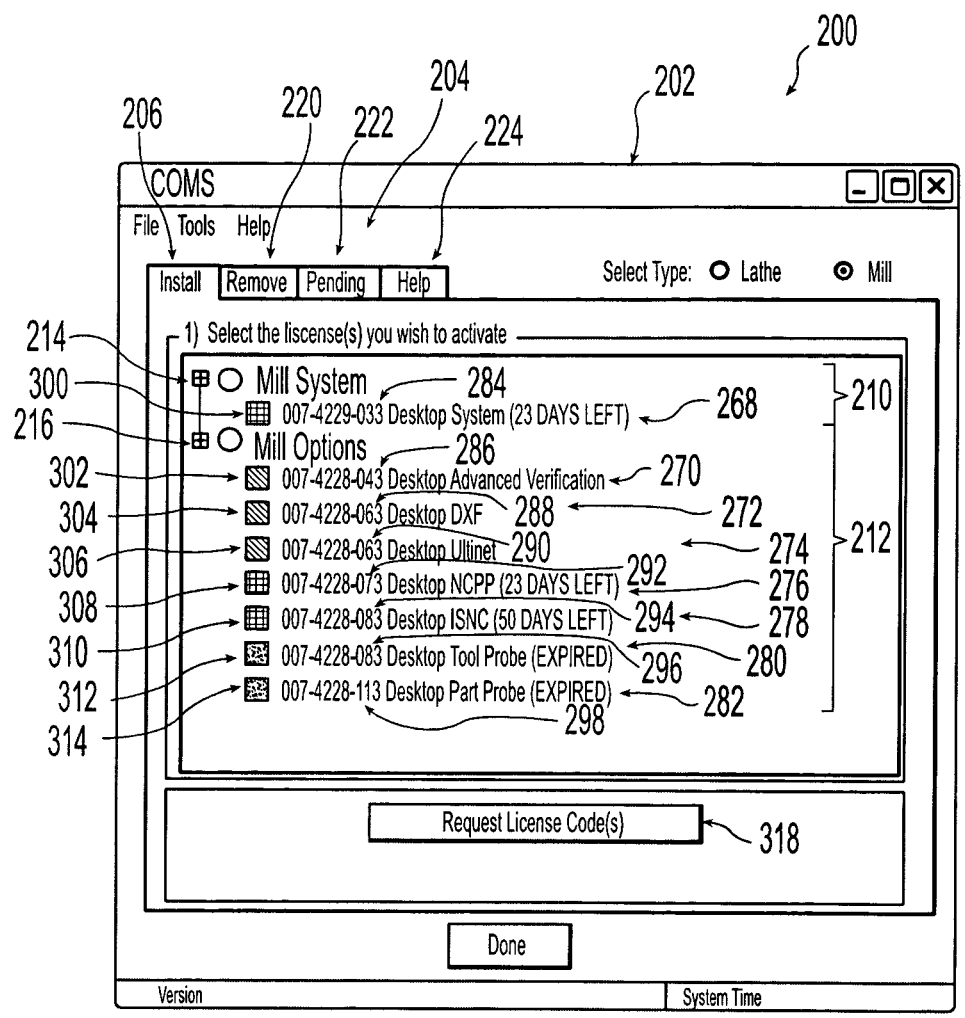
FIG. 14 is another screen shot of the options management software of FIG. 5 illustrating an install tab including an active timed version system software, two active timed version software options, three pending software options, and two expired software options.

Referring to FIG. 14, user interface 200 is shown with another assortment of software option components 129 installed thereon. As shown in FIG. 14, Desktop System 268 and options 270-282 are available with this assortment. However, unlike FIG. 12 wherein each of Desktop System 268 and options 270-282 are capable of full enablement ("0" for second portion of the respective option codes), in FIG. 14 each of Desktop System 268 and options 270-282 are available for a timed activation. In the illustrated example, the timed activation is for sixty days ("3" for second portion of the respective option codes).

As indicated by visual markers 300, 308, and 310, Desktop System 268, Desktop NCPP 276, and Desktop ISNC 278 are activated. Each of Desktop System 268 and Desktop NCPP 276 are due to expire in 23 days. Desktop ISNC 278 is due to expire in 50 days. Options Desktop Advanced Verification 270, Desktop DXF 272, and Desktop Ultinet 274 are pending. Options Desktop Tool Probe 280 and Desktop Part Probe 282 have expired. In one embodiment, timed options are used for customer system 100 which are leased.

Figure 15:
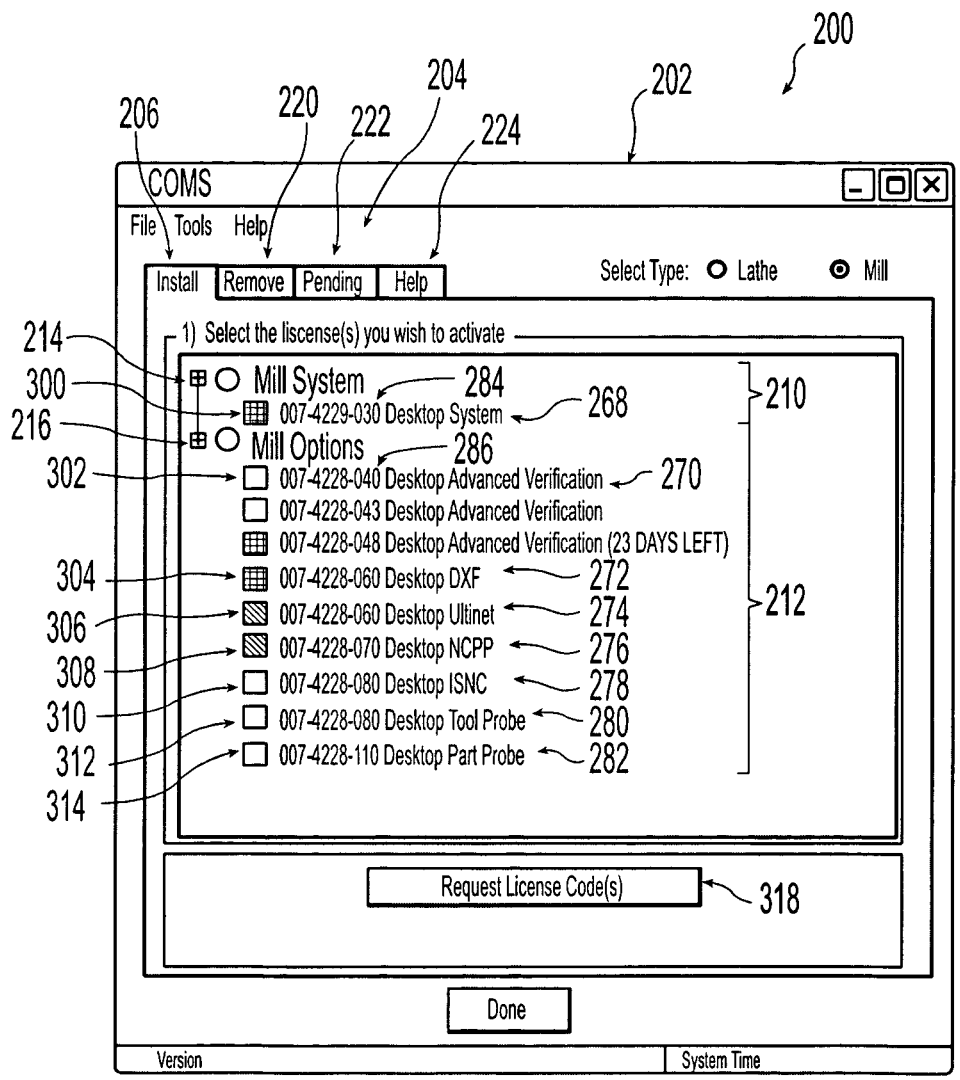
FIG. 15 is another screen shot of the options management software of FIG. 5 illustrating an install tab including an active system software, one active software option, one active trial version software option, two pending software options, and five available software options.

Referring to FIG. 15, user interface 200 is shown with another assortment of software option components 129 installed thereon. As shown in FIG. 14, Desktop System 268 and options 270-282 are available with this assortment. Each of Desktop System 268 and options 270-282 are capable of full enablement ("0" for second portion of the respective option codes). In FIG. 15, two additional options 368 and 370 are shown. Options 368 and 370 are two alternative activations of Desktop Advanced Verification 270. Option 368 is a sixty day timed option. Option 370 is a thirty day promotional option. Option 470 is currently activated and has 23 days left till its expiration.

Figure 16:
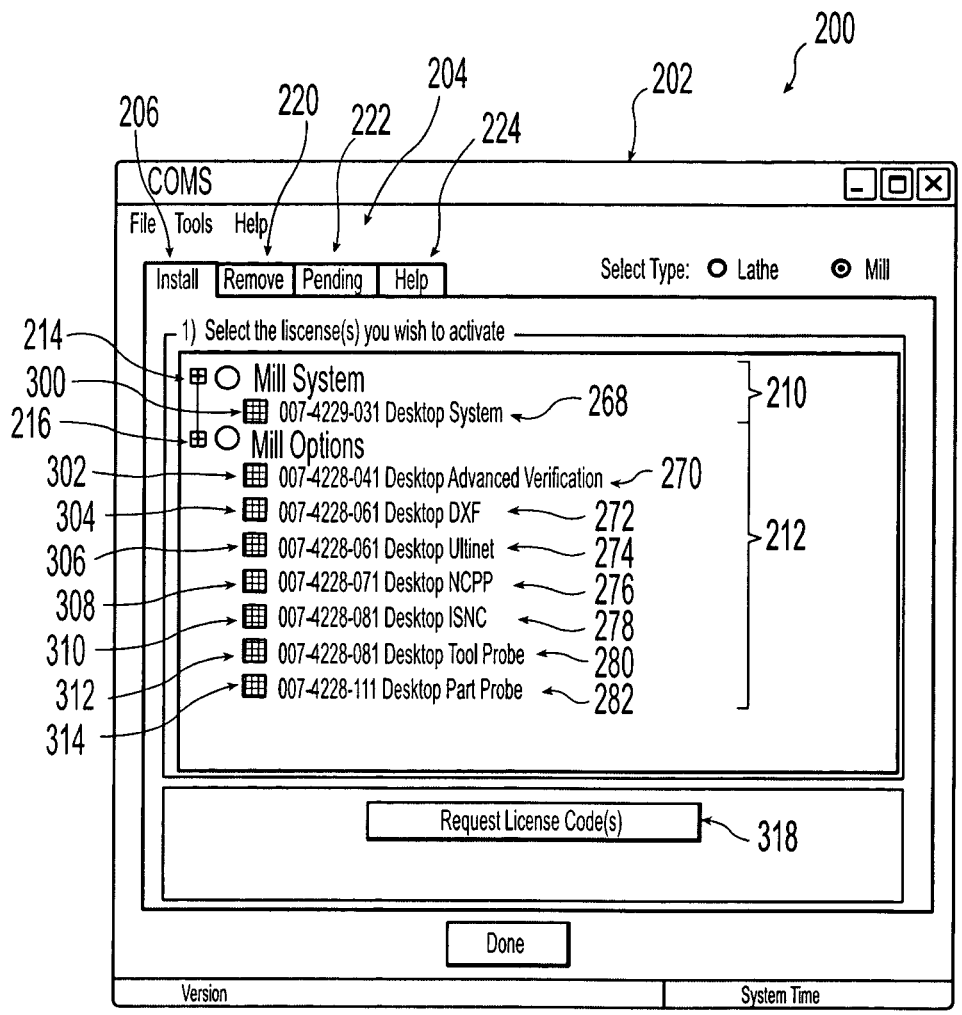
FIG. 16 is another screen shot of the options management software of FIG. 5 illustrating an install tab including an active testing version system software and seven active testing version software options.

Referring to FIG. 16, user interface 200 is shown with another assortment of software option components 129 installed thereon. As shown in FIG. 14, Desktop System 268 and options 270-282 are available with this assortment. However, unlike FIG. 12 wherein each of Desktop System 268 and options 270-282 are capable of full enablement ("0" for second portion of the respective option codes), in FIG. 16 each of Desktop System 268 and options 270-282 are available for testing ("1" for second portion of the respective option codes) the operation of customer system 100 and, if available, machine tool apparatus 102. The testing activation of Desktop System 268 and options 270-282 may be used during a quality check of customer system 100 and, if available, machine tool apparatus 102 to verify the correct operation of customer system 100 and, if available, machine tool apparatus 102.

Figure 17:
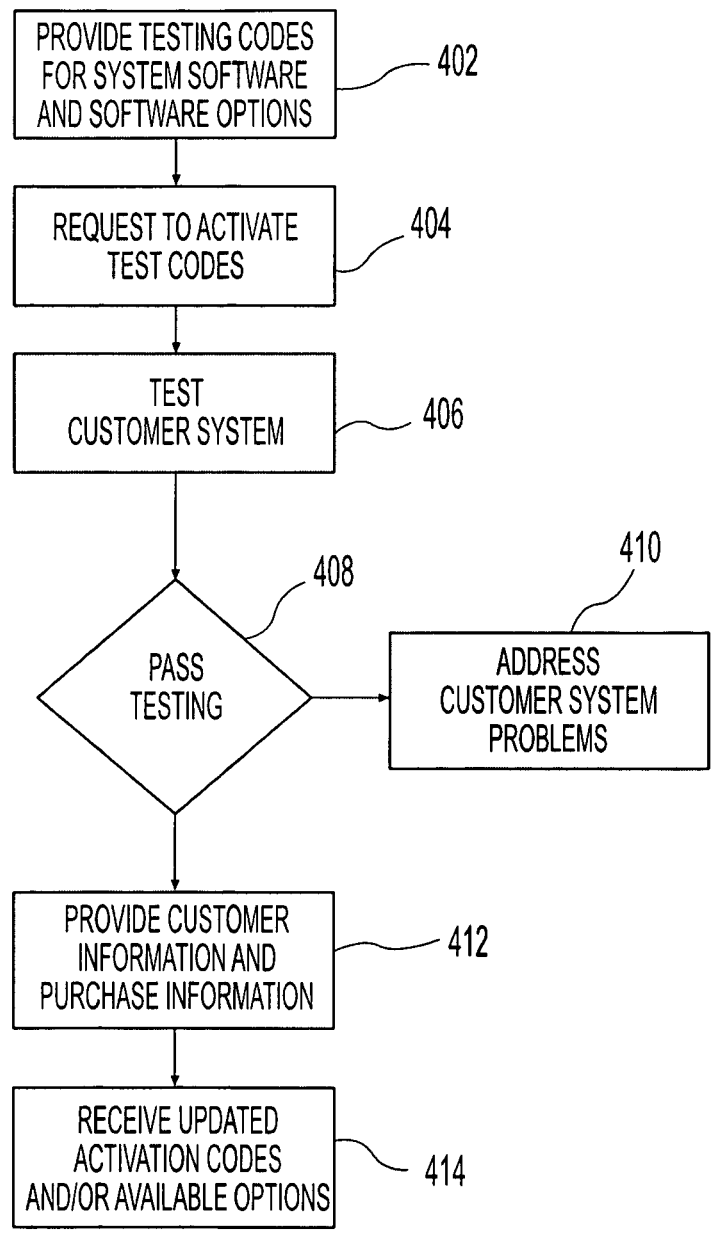
FIG. 17 is an exemplary flowchart of a testing and initial software configuration procedure.

Referring to FIG. 17, a method 400 for setup of a customer system 100 and associated machine tool apparatus 102 is provided. During assembly of customer system 100 and machine tool apparatus 102, the option codes for the testing variation of Desktop System 268 and options 270-282 are provided on memory 104, as represented by block 402. Next, a request to activate the testing flavor of Desktop System 268 and options 270-282 is sent, as represented by block 404. In one embodiment, the operator making the request in block 404 is an authorized representative 152. Once Desktop System 268 and options 270-282 are activated, the various components of customer system 100 and machine tool apparatus 102 are tested, as represented by block 406.

If customer system 100 and machine tool apparatus 102 do not pass all of the tests, customer system 100 and machine tool apparatus 102 are sent to address whatever failures occurred, as represented by block 410. If customer system 100 and machine tool apparatus 102 pass all of the tests, then the testing options are deactivated and the customer information and purchase information are stored on memory 104, as represented by block 412. Finally, an updated set of available options and activation codes for options purchased at installation are provided to customer system 100, as represented by block 414.

Figure 19:
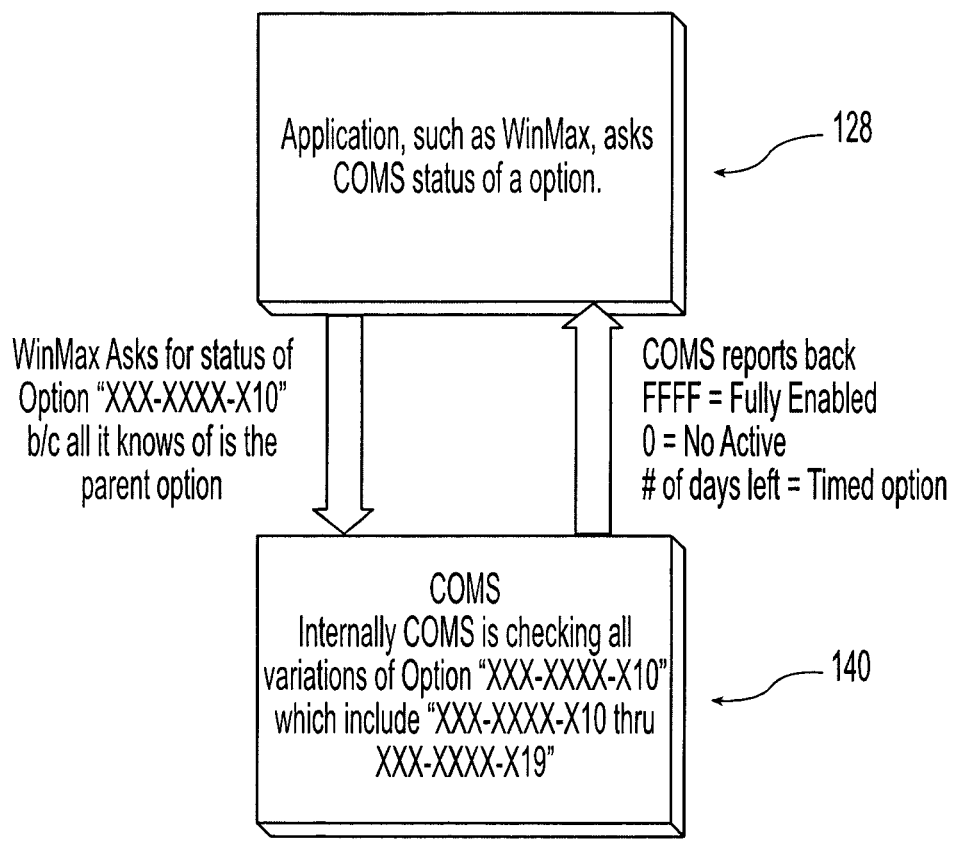
FIG. 19 is a representative view of an exemplary interaction between the customer options software and the system software.

Referring to FIG. 19, an exemplary method 430 of the operation of between base system software component 128 and customer option management software 140 is disclosed. Each time base system software component 128 requests a software option, base system software component 128 sends a query to customer option management software 140 to determine if the respective software option is activated. As shown in FIG. 19, base system software component 128 provides the base option code and customer option management software 140 internally checks all variations of the base option code to determine if any variation of the option is activated. Customer option management software 140 reports back to base system software component 128 the results of its determination. If the option is active, base system software component 128 is able to utilize the option.

The use of customer options management software 140 and provider option management software 158 provide for ease of accounting. Each option part number (i.e. full cost, timed, no cost) may have a different monetary amount associated with it. From an auditing perspective customer options management software 140 and provider option management software 158 may track serial numbers for first operating system software 110, and a serial number for a real time operating system and other software components. This tracking information may then be used to verify the number of licenses when software provider 156 is audited by a vender of the particular software, such as Microsoft in the case of Windows XP.

From a control perspective customer options management software 140 and provider option management software 158 are used to limit certain machine tool software 114 functionality in jurisdictions foreign to the United States. For example, five axis control software may not be sold to customers in certain foreign jurisdictions. Customer options management software 140 and provider option management software 158 serves as a roadblock to activating software illegally obtained in these foreign jurisdictions. Customer options management software 140 and provider option management software 158 will not recognize the information provided with the option part numbers and will not provide the activation codes.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A method for requesting activation of a software option of a machine tool software, the software option being associated with a base system software of the machine tool software of a customer system which is associated with a machine tool apparatus, the method comprising the steps of:
   determining with the customer system a machine identification based on information which uniquely identifies the customer system;
   comparing a stored machine identification with the determined machine identification; in response to the stored machine identification matching the determined machine identification, presenting a listing of one or more software options available for activation with an output device of the customer system, the one or more software options effecting a motion of a tool associated with the machine tool apparatus along a programmed trajectory, the one or more software options available for activation being previously installed on the customer system associated with the machine tool apparatus;
   receiving with a user input of the customer system associated with the machine tool apparatus a selection of at least a first software option to be activated;
   requesting an activation code for the first software option, the activation code being based on information identifying the first software option and the machine identification; receiving the activation code for the first software option; determining with the customer system an expected activation code, the expected activation code being based on information identifying the first software option and the machine identification;

comparing the received activation code to the expected activation code; and in response to the received activation code matching the expected activation code activating the first software option.

2. The method of claim 1, wherein the listing only includes software options which are installed on the customer system.

3. The method of claim 1, further comprising the step of presenting a listing of activated software options with the output device.

4. The method of claim 1, wherein the step of presenting one or more software options available for activation with the output device for at least the first software option includes the step of providing an indication of a subset that the first software option is associated with selected from a plurality of subsets.

5. The method of claim 4, wherein the subset that the first software option is associated with is a fully enabled subset.

6. The method of claim 4, wherein the subset that the first software option is associated with is a timed option.

7. The method of claim 6, wherein the timed option is associated with a lease term.

8. The method of claim 6, wherein the timed option is associated with a promotional term.

9. The method of claim 6, wherein the subset that the first software option is associated with is a testing option.

10. A method for providing an activation of a requested software option associated with a base system software of a customer system associated with a machine tool apparatus, the method comprising the steps of:

receiving a request for an activation of a requested software option already installed on the customer system associated with the machine tool apparatus, but not yet activated, the requested software option effecting a motion of a tool associated with the machine tool apparatus along a programmed trajectory, the request including an option part number for the requested software option and a machine identification number of the customer system associated with the requested software option, the machine identification number is based on unique information of the customer system, the unique information relating to one of a portion of a hardware address, a portion of a hard drive serial number, and a portion of an install time of an operating system; and generating an activation code based on the option part number for the requested software option and the machine identification number of the customer system.

11. The method of claim 10, wherein the step of receiving a request for an activation of a requested software option including an option part number for the requested software option includes the step of receiving an e-mail including the request.

12. The method of claim 11, further comprising the step of determining if the e-mail is from an authorized representative.

13. The method of claim 10, wherein the machine identification number is based on unique information of the customer system including an install time of an operating system of the customer system.

14. The method of claim 10, wherein the request further includes an option request time.

15. The method of claim 14, wherein the option request time is represented as a number of seconds from a specific instance in time.

16. The method of claim 10, wherein the activation code is further based on the machine identification.

17. The method of claim 14, wherein the activation code is further based on the machine identification and the option request time.

18. The method of claim 14, wherein the activation code is further based on the option request time.

19. The method of claim 10, wherein the requested software option is a timed software option and the activation code is further based on an amount of time associated with the timed software option.

20. The method of claim 1, wherein the expected activation code is determined by the customer system based on the machine identification, information related to the first software option, and a time associated with the step of requesting the activation code for the first software option.

21. The method of claim 1, wherein the customer system includes customer option management software which determines the machine identification and the expected activation code, further the customer option management software each time a software option is requested by a base software of the machine tool software determines if the software option is still activated.

22. The method of claim 1, wherein the machine identification is based on a portion of the hardware address, a portion of the hard drive serial number, and a portion of an install time of the operating system of the customer system, the portion of the hardware address of customer system is based on the three lowest order bytes of the hardware address, the portion of the hard drive serial number of customer system is based on the three lowest order bytes of the hard drive serial number, and the portion of the install time of the operating system of customer system is based on the three lowest order bytes of the install time of the operating system, which are combined to form the machine identification number for the customer system.

23. The method of claim 1, wherein the information identifying the customer system is further based on unique information of the customer system including an install time of an operating system of the customer system.

24. The method of claim 1, wherein the machine identification includes a portion of a hardware address of the customer system and a portion of a hard drive serial number of the customer system.

25. The method of claim 10, wherein the machine identification is based on a portion of the hardware address, a portion of the hard drive serial number, and a portion of an install time of the operating system of the customer system, the portion of the hardware address of customer system is based on the three lowest order bytes of the hardware address, the portion of the hard drive serial number of customer system is based on the three lowest order bytes of the hard drive serial number, and the portion of the install time of the operating system of customer system is based on the three lowest order bytes of the install time of the operating system, which are combined to form the machine identification number for the customer system.

* * * * *